United States Patent [19]

Wreede et al.

[11] Patent Number: 5,013,584
[45] Date of Patent: May 7, 1991

[54] METHOD OF REDUCING THE PERMEABILITY OF PLASTIC OPTICAL ARTICLES

[75] Inventors: John E. Wreede, Monrovia; Edward T. Knobbe, Playa Del Rey, both of Calif.

[73] Assignee: Hughes Aircraft Company, Los Angeles, Calif.

[21] Appl. No.: 323,176

[22] Filed: Mar. 15, 1989

Related U.S. Application Data

[63] Continuation of Ser. No. 123,493, Nov. 20, 1987, abandoned.

[51] Int. Cl.$^5$ .................. B05D 5/06; C23C 16/40
[52] U.S. Cl. .......................... 427/162; 427/164; 427/255.3; 427/307; 427/322
[58] Field of Search ............... 427/255.1, 255.2, 255.3, 427/162, 164, 307, 322, 255.4; 428/446, 412, 500, 522, 698, 702

[56] References Cited

U.S. PATENT DOCUMENTS

| | | | |
|---|---|---|---|
| 3,957,559 | 5/1976 | Hoffman | 427/255.3 |
| 4,374,163 | 2/1983 | Isenberg | 427/255.2 |
| 4,501,777 | 2/1985 | Rose | 427/255.1 |
| 4,552,786 | 11/1985 | Berneburg et al. | 427/255.1 |
| 4,609,562 | 9/1986 | Isenberg et al. | 427/255.2 |

FOREIGN PATENT DOCUMENTS

| | | | |
|---|---|---|---|
| 2052397 | 1/1971 | Fed. Rep. of Germany | 427/322 |
| 49-41469 | 4/1974 | Japan | 427/322 |
| 58-79028 | 5/1983 | Japan | 427/322 |

*Primary Examiner*—Sadie Childs
*Attorney, Agent, or Firm*—Leonard A. Alkov; Wanda K. Denson-Low

[57] ABSTRACT

A method for treating permeable plastics and other porous materials to provide solid barriers within the materials that reduce permeability. One method involves migrating a first gas reactant into the material and migrating a second reactant into the material wherein the first and second reactants react at a reaction interface to form a solid reaction product which provides reduced gas permeability for the material. Embodiments are disclosed in which gaseous reactants are migrated from opposite sides of the material to form an internal gas impermeable barrier. Embodiments are also disclosed where the reactants are sequentially migrated into the material to produce gas impermeable barriers. Swelling of the materials prior to treatment with reactants is also disclosed in order to maximize permeation and reactant migration.

14 Claims, 1 Drawing Sheet

METHOD OF REDUCING THE PERMEABILITY OF PLASTIC OPTICAL ARTICLES

This application is a continuation of U.S. application Ser. No. 07/123,493, filed Nov. 20, 1987, now abandoned.

The present application has been revived for purposes of continuity and, accordingly, the continuing application complies with the copendency requirements of 37 CFR 1.62.

BACKGROUND OF THE INVENTION

1. Field of the Invention

The present invention relates generally to methods for reducing the gas permeability of porous materials. More specifically, the invention relates to the reduction or elimination of gas diffusion through these materials by chemically reacting various chemicals within the porous material to form solids which block diffusion through the porous material. 2. Description of Related Art Plastic materials are widely used due to their light weight, impact resistance and optical clarity. However, plastic materials are, by their nature, permeable to most gases, including water vapor. There are many uses for plastics where it would be desirable to reduce or eliminate the permeability of the plastic to gases. For example, polycarbonate is used as a substrate and cover for dichromated gelatin holograms in pilot's visors. The light weight, impact resistance and optical clarity of the polycarbonate makes it a desirable material for use in such pilot's visors. However, the inherent gas permeability of polycarbonate allows moisture to be transmitted through the polycarbonate within a few days thereby affecting the dichromated gelatin hologram.

Possible pilot's visors which have been suggested to eliminate moisture contamination of the hologram include visors made from glass, glass-plastic laminates and visors using a vapor deposited glass layer on the surface of the plastic. All of these proposed visors have disadvantages. For example, glass alone is too heavy. Laminated structures in which thin layers of glass (approximately 0.003 inch) are laminated between plastic layers is acceptable for flat substrates but is difficult to work with when it must be spherically or tor... ly formed. Further, cracking can occur upon minor ..pact.

The depositing of a layer of glassy or crystal material onto the surface of a plastic visor in order to reduce permeability has shown some promise. These coatings are typically applied by various vapor deposition procedures, including sputtering and gas phase reactions. Since these coatings are all applied to the surface of the plastic, they are all subject to thermal stresses, abrasion and mechanical stresses. Problems have been experienced with these coatings because they tend to fail under long exposure to high humidity and/or high temperatures. Further, it is difficult to vapor deposit glass as a layer on plastic without the formation of small pinholes.

Attempts to reduce the permeability of plastics are set forth in U.S. Pat. Nos. 4,318,970; 4,329,409; and 4,330,604 patents disclose the use of crystalline and glassy deposited films and the use of thick layers of glass sandwiched between plastic. Also, prestressed plastics have been formed in which solid silicon particles are embedded in a plastic matrix and then subsequently oxidized by diffusing in oxygen gas. This results in a material with reduced permeability, however the material is not optically transparent. Also, the solid silicon has to be embedded in the plastic melt first with the subsequent treatment using oxygen gas to form $SiO_2$ aggregates. These $SiO_2$ aggregates are nearly the size of the silicon particles and not molecular in size. This results in a standard "filled" plastic which has the slight advantage of being stressed due to the increased size of the filler. However, the silicon particles are deposited randomly and therefore do not provide optimum reduction in permeability.

The above example is just one of many different situations where it would be desirable to have a plastic material which has been treated to reduce its gas permeability while at the same time not adversely affecting the optical and physical characteristics of the plastic. Accordingly, there presently is a need to provide a simple and effective means for blocking the transmissive "channels" in plastic materials and porous materials in general in order to make the materials suitable for uses where gas impermeability is required.

SUMMARY OF THE INVENTION

In accordance with the present invention, a method is provided for reducing the permeability of permeable materials in general and especially plastics. The present invention is based upon a method for reducing gas permeability of materials wherein first and second reactants are migrated into the material in such a manner that they react at a reaction interface to form a solid reaction product. The solid reaction product is believed to block the transmissive "channels" in the porous material. This effectively reduces that portion of the permeability due to physical diffusion.

The diffusion deposited barrier layer in accordance with the present invention provides solid products which fill the interstitial voids within the porous structure. Since the reactants are introduced into the material by diffusion, the resulting solid reaction products fill only the voids through which gases or vapors are transmitted. As an advantage of the present invention, no crazing or other physical damage to the barrier layer can occur unless the structure itself is damaged. This is due to the fact that the reaction interface is located well within the structure itself. Further, there is little or no effect in the optical properties provided that the reaction product is itself not absorbing because the particles formed are small compared to the wavelength of light.

In one preferred embodiment of the present invention, porous panel or plate type structures are made less permeable by migrating the reactants into the structure from opposite sides. A reaction interface is formed centrally within the plate or panel at the location where the diffusing reactants contact. The result is a solid barrier which prevents or substantially reduces the passage of gas or vapors through the panel.

In another preferred embodiment, the porous material is treated sequentially with the reactants. This method allows a barrier layer to be formed beneath the surface on all sides of the structure. The method can be carried out in two steps or the reactants can be alternated as often as desired.

As a feature of the present invention, the rate of diffusion or migration of the reactants into the porous materials to provide the desired gas impermeable barrier may be increased by pretreatment of the porous material with selected swelling agents. The swelling agents may be nonreactive or can include reactants.

Diffusion of reactants into the substrate material may also be increased by raising the plastic above its glass transition (Tg) temperature. This has the added advantage of also increasing the rate of reaction of the reactants or increasing the percentage of molecules which have sufficient energy to react.

The above-discussed and many other features and attendant advantages of the present invention will become apparent as the invention becomes better understood by reference to the following detailed description when considered in conjunction with the accompanying drawings.

DETAILED DESCRIPTION OF THE DRAWINGS

DESCRIPTION OF THE PREFERRED EMBODIMENTS

The present invention can be used to reduce the permeability of a wide variety of porous materials. The invention is particularly well suited for reducing the gas permeabilities in plastic materials. Accordingly, the following description will be limited to plastic materials and structures with it being understood that the invention can be used in connection with other materials. One limitation is that the material must not itself react with the various reactants used to form the barrier solids and that the porosity of the material must be sufficiently low initially so that the reactants can be controllably diffused into the structure to form sufficient solid material to plug the gas transmitting passageways through the material.

The present invention can be used to reduce the gas permeability in a wide range of plastics. These include the thermoplastic and thermosetting polymers. Examples of some suitable plastics include polymers and copolymers of polystyrene, silicone rubber, nylon, polycarbonate, polypropylene, polyethylene, polyester, vinyl type polymers, polymethyl methacrylate, cellulose acetates, etc.

Figure 1:
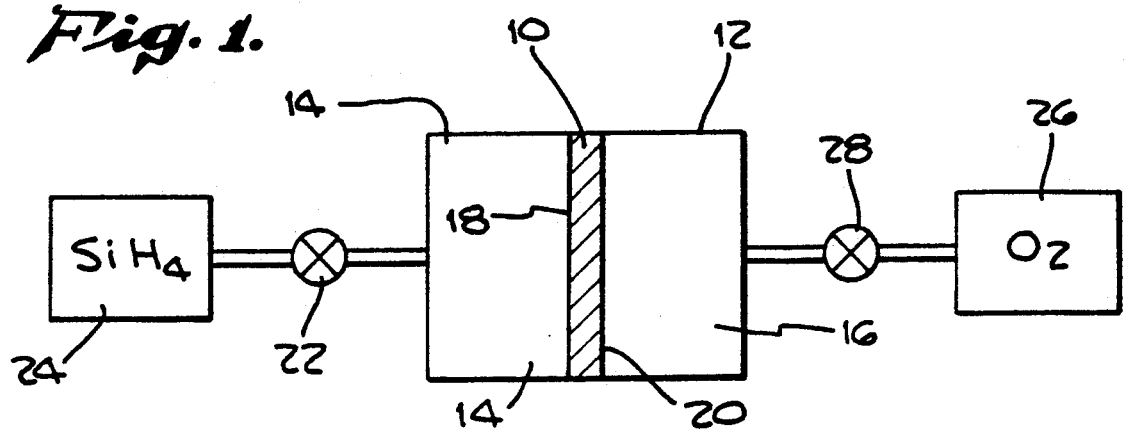
FIG. 1 is a schematic representation of a first embodiment of the present invention wherein the reactants are introduced onto opposite sides of the structure. This figure shows the structure diagrammatically prior to treatment.
Figure 2:
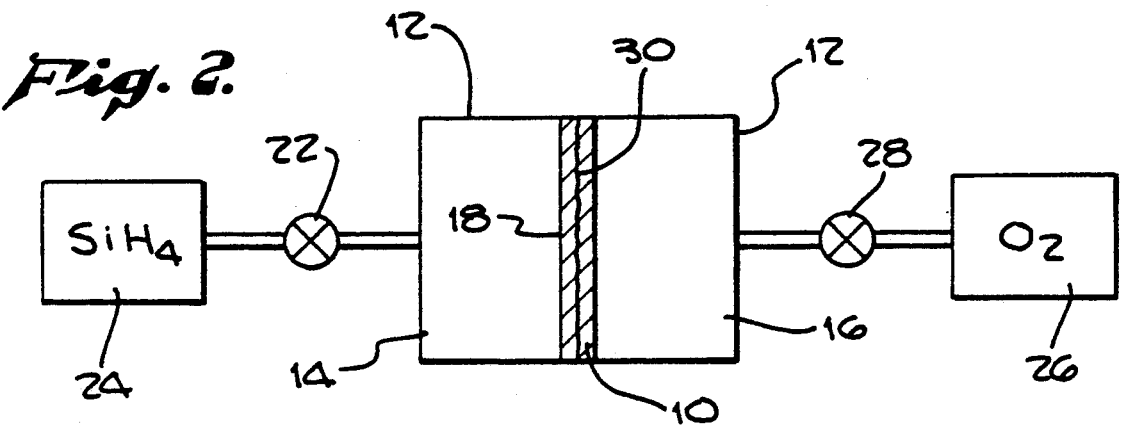
FIG. 2 is a diagrammatic representation of the preferred embodiment shown in FIG. 1 wherein the structure is shown after treatment.

A first exemplary embodiment of the present invention is shown schematically in FIGS. 1 and 2. In FIG. 1, the plastic panel or plate 10 is placed within a suitable chamber 12 such that the plastic panel 10 divides the chamber 12 into a first reactant chamber 14 and a second reactant chamber 16. The plastic panel 10 can be described as having a first surface 18 and a second surface 20 which are on opposite sides of the plastic panel 10. It is important that the two reactant chambers 14 and 16 be completely sealed from each other to prevent uncontrolled mixing of the reactants and possible explosion.

Valve 22 controls the flow of the first reactant into the first reactant chamber 14. The first reactant is kept in a suitable container which is shown diagrammatically at 24. For the purposes of illustration, the first reactant is shown to be silane and the second reactant which is introduced from reservoir 26 through valve 28 is oxygen. Other possible reactants and suitable reactant combinations will be discussed below.

The relative amounts of silane and oxygen gas which are introduced into their respective chambers 14 and 12 can be varied depending upon the particular plastic panel 10 being treated. However, sufficient silane and oxygen must be introduced so that the two gases migrate from their respective sides of the plate structure 10 toward the center of the plate 10.

After a sufficient time, the migrating silane and oxygen gases meet within the plate 10 to react and form silicon dioxide ($SiO_2$) as shown schematically at 30 in FIG. 2. The reaction involves a gas phase reaction at a reaction interface to form a solid reaction product as represented at 30. The reaction between the silane and oxygen is self-limiting since the reaction product is a solid ($SiO_2$) which prevents further diffusion of the gases and hence further reaction. In addition, it is believed that the reaction rate is not just dependent on the rate of diffusion of the reactant species, but on the number of diffused molecules which have sufficient energy to react. Thus, even though silane and oxygen react explosively at room temperature, this reaction proceeds quite controllably when the molecules are mixed at a low rate during diffusion into the plastic structure 10.

For clear plastics such as silicone rubbers, polycarbonate and acrylates, it is preferred that the solid material which is formed is silicon dioxide in order to reduce undesirable effects on the optical quality of the plastic. In these situations, reactants which are capable of reacting to form silicon dioxide are preferred. Suitable first reactants include silane and chlorinated silanes such as trichlorosilane and tetrachlorosilane. Fluorosilanes are also possible as well as organometallics containing titanium or aluminum. Suitable second reactants include oxygen, ammonia, water vapor or other suitable gaseous source of oxygen. High energy triplet state oxygen reacts very well with silanes but may also attack a plastic substrate. When ammonia is used as the oxidizer, notrides are formed such as silicon nitride. Water vapor should be used only with halosilanes.

In certain applications where the optical clarity and/or transmission characteristics of the plastic are not important, other reactants can be utilized so long as they are capable of diffusing into the plastic at reasonable rates and reacting to form a gas impermeable solid. Lead compounds and arsenic compounds, such as arsine, which are analogous to the silanes can be used wherein the final plastic is desired to be opaque or colored.

The use of gaseous reactants is preferred since they provide optimum diffusion into plastic materials which tend to be impermeable to liquids. Preferably, the temperature of the plastic during treatment is maintained above the glass transition temperature (Tg), but below the melting point or decomposition temperature of the plastic. Temperatures within this range are preferred since they provide an increased rate of migration of the reactants into the plastic and increased reaction rate.

A preferred method for increasing the rate of reactant diffusion into the plastic material involves treating the plastic with a swelling agent prior to treatment with the reactants. Suitable swelling agents include halogenated hydrocarbons such as carbon tetrafluoride which provides swelling of the plastic material in order to increase the plastic pore sizes to allow increased diffusion rates for the reactant gases into the plastic. If desired, one of the reactants may be incorporated into the swelling agent or one of the reactants may be a swelling agent as in the case of water which can be used as a swelling agent and a reactant.

The method shown in FIG. 1 is preferably carried out with simultaneous diffusion of the reactants from opposite sides of the plastic structure. However, it is possible, if desired to introduce the reactive gases at different times onto the opposite sides of the plastic structure 10 shown in FIGS. 1 and 2 provided that the relative gas pressures and migration rates are chosen so that the gas reactants react at a reaction interface located between the first and second surfaces 18 and 20.

When introducing gases at different times, care must be taken to prevent damage from pressure differentials. The system works at atmospheric pressure but the diffusion rate is higher at elevated pressures. The limitation is in the pressure differential rather than absolute pressure. It is preferred that the gas reservoirs in each side of the substrate be minimized in volume to reduce the explosion hazard should a rupture occur.

Figure 3:
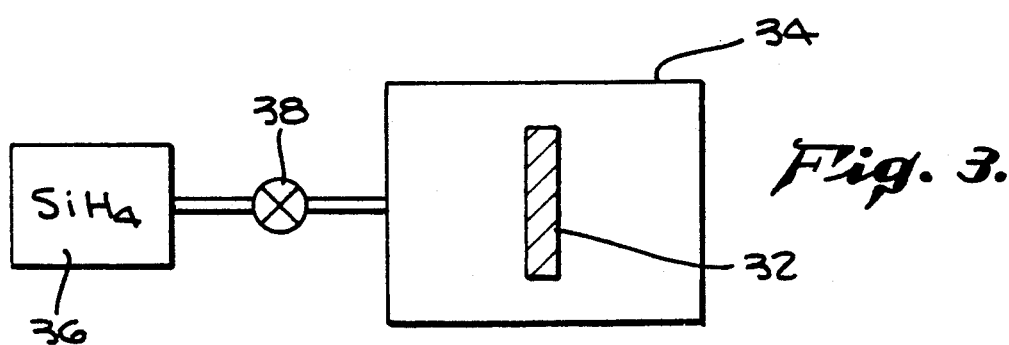
FIG. 3 is a diagrammatic representation of a second embodiment of the present invention wherein the first reactant is added prior to the second reactant.
Figure 4:
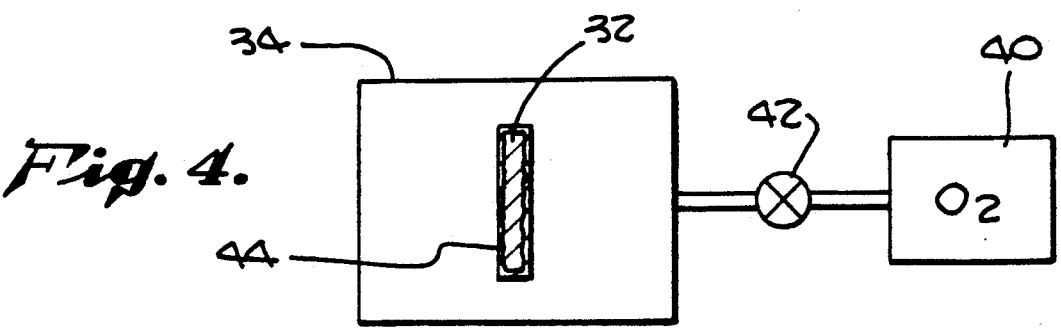
FIG. 4 is a diagrammatic representation of the second preferred exemplary embodiment showing the structure after the second reactant has been diffused into the structure.

A second embodiment of the present invention is shown schematically in FIGS. 3 and 4. This embodiment involves the sequential addition and diffusion of reactants into the plastic. Referring to FIG. 3, a plastic structure 32 is placed within a chamber 34 and treated with a first reactant gas which is introduced from reservoir 36 via valve 38. Again, the exemplary first reactant is silane. The silane is allowed to diffuse into the plastic structure 32 for a sufficient time and at a sufficient temperature so that the silane has migrated into the structure. The chamber 34 is then evacuated and oxygen is introduced as shown in FIG. 4 from a reservoir 40 via valve 42.

As the oxygen begins to migrate into the plastic structure 32, it reacts with the silane present therein to form a solid reaction product layer as represented at 44. The processing can be repeated as often as desired to continue to build up the layer of reaction product. This solid reaction product is not formed on the surface of the plastic structure 32 but is formed at a small distance below the surface. This exemplary embodiment is preferred when it is desired to provide gas impermeability to all sides of a structure as opposed to the single diffusion barrier 30 provided when the invention is carried out in accordance with the embodiment described in connection with FIGS. 1 and 2.

Another advantage of sequential reactant migration is that since the reactants are introduced in the chamber at different times, the concentration and pressures of the gases can be as high as desired and the shape of the structure 32 is unimportant. This is to be contrasted with the first embodiment wherein the plastic structure being treated must be shaped so that sealed chambers on opposite sides of the structure can be prepared in order to migrate the gaseous reactants into the structure from opposite sides.

Nitrogen flush systems (not shown) are preferably provided for the apparatus schematically represented in the FIGS. so that the reactant chambers can be purged prior to introduction of the reactants.

An example of a method carried out in accordance with the first described embodiment is as follows. A sheet of transparent silicone rubber (0.07 inch thick) was put into a reaction vessel. The silicone rubber was mounted so that the reaction vessel was separated into two separate chambers. After flushing both chambers with nitrogen gas, one chamber was filled with silane gas at one atmosphere pressure, while the other chamber was filled with oxygen at one atmosphere pressure. Migration of the gases into the sheet of silicone rubber was allowed to proceed overnight at room temperature (approximately 25° C.). The permeability of the silicone rubber to water was measured before and after the reaction. The permeability of the silicone to water was found to be reduced by a factor of four. There were a few areas of white frost (corresponding to large pinholes) which were brushed from the surface of the sheet. No significant change was noted in the transparency of the silicone rubber once the white frost was removed from the surface. There also was no apparent degradation in the flexibility of the silicone rubber and there were no other apparent ill effects. Flexing of the rubber did not appear to affect the reduction in permeability as would have happened with a deposited coating.

In another example, polycarbonate is substituted for silicone rubber. Since polycarbonate is less gas permeable than silicone rubber, the diffusion time for the silane and oxygen into the polycarbonate sheet is increased to at least 7 days at room temperature.

Another example utilizing polycarbonate is carried out in the same manner as the previous two examples except that the polycarbonate is treated with chloroform vapors to swell the plastic prior to treatment with silane and oxygen. The amount of chloroform used is sufficient to swell the polycarbonate while not damaging the optical properties or structural integrity of the polycarbonate. Chloroform and other halogenated hydrocarbons are preferred because they have the added advantage of also being a solvent for the reactants to thereby increase the rate of penetration of the reactants into the plastic.

In another example, polycarbonate is treated in accordance with the method set forth in FIGS. 3 and 4 wherein the reaction chamber is filled with silane to a pressure of 1-20 atmospheres. The polycarbonate is maintained at a temperature slightly above the glass transition temperature for polycarbonate for approximately 2-8 hours or until the silane has saturated the polycarbonate. The chamber is then purged and oxygen is introduced and maintained at a pressure of about 1-20 atmospheres for at least 2-8 hours or until the reaction between oxygen and silane at the reaction interface is completed. In order to increase penetration of the silane and oxygen, the polycarbonate is preferably pretreated with chloroform to slightly swell the plastic.

In conducting the exemplary methods as set above, it is preferred that temperatures above the glass transition point of the plastic (but below the melting point) be used to provide increased reactivity of the reactants as well as increased permeation or penetration. Also, photo-activated oxygen is preferred to increase reactivity. The use of halogenated silanes is also preferred to provide slightly less gas diffusion in the plastic, but a greater transfer by solubility thereby resulting in a net increase in total permeability of the molecule. In addition, the reactant gases can be mixed with inert gases, such as helium or nitrogen, to vary the relative partial pressures of the reactants. This is especially preferred in the first embodiment disclosed in FIGS. 1 and 2 wherein it is desirable to maintain equivalent pressures on both sides of the plastic sheet.

When activated oxygen is used polycarbonate is being treated in accordance with the present invention, it is important to maintain the proper pressures of the reaction component in order to prevent excessive reactivity of the triplet state of oxygen with the polycarbonate. To prevent such excessive reaction of the oxygen with polycarbonate, the reaction interface should be close to the oxygen rich surface or side of the polycarbonate. The reaction interface is preferably about $1 \times 10^{-5}$ centimeters from the surface. This is equal to the mean free path of a gas at one atmosphere pressure.

The diffusion rate of water vapor through 0.030 inch polycarbonate is about $2.4 \times 10^{-7}$ gm/cm$^2$/hour for 100 percent R.H. at 20° C. (partial pressure of $H_2O = 17$ millimeters of Hg). This is equivalent to $1 \times 10^{16}$ water molecules/cm$^2$/hour. It is preferable that the reaction proceed at a faster rate. At 2 atmospheres of pressure, silane diffusion is 100 times faster through polycarbonate than that of water vapor at the partial pressure of 17 mm Hg. Since the reaction interface will be near the oxygen rich surface, the silane diffusion is the rate determining factor. Oxygen diffuses $1 \times 10^{-5}$ cm, whereas silane has to diffuse 0.08 cm.

In all of the above-described examples, unreacted reactants such as silane, oxygen, water and any inert gases or preliminary reaction materials will remain in the plastic on opposite sides of the solid barrier. It is preferred that these remaining species be removed by vacuum baking or other suitable process.

Having thus described exemplary embodiments of the present invention, it should be noted by those skilled in the art that the within disclosures are exemplary only and that various other alternatives, adaptations and modifications may be made within the scope of the present invention. For example, thin films of saran can be treated by the procedures described above to make a less permeable saran wrap for use in wrapping food and other items to keep them fresh. Accordingly, the present invention is not limited to the specific embodiments as illustrated herein, but is only limited by the following claims.

What is claimed is:

1. A method for reducing the permeability of a plastic optical article made from gas permeable material, said method comprising the steps of:
    migrating a first reactant into said material, wherein said first reactant is selected from the group consisting of silane, chlorosilane, and fluorosilane; and
    migrating a second reactant into said material, wherein said second reactant comprises a gas selected from the group consisting of oxygen and water vapor, wherein said first and second reactants are migrated to react at a reaction interface to form solid reaction product particles consisting essentially of silicon dioxide which form a barrier layer that reduces the permeability through said plastic material, said silicon dioxide particles being small compared to the wavelength of light so that said barrier layer has little or not effect on the optical properties of said plastic optical article.

2. A method according to claim 1 wherein said material is selected from the group consisting of gas permeable plastics comprising silicone rubbers, polycarbonate, polypropylene, polystyrene, acrylic, polyethylene, polyesters, and cellulose acetate.

3. A method according to claim 1 wherein said plastic material is polycarbonate, said first reactant is silane and said second reactant is oxygen.

4. A method according to claim 1 wherein said optical article includes first and second surfaces on opposite sides of said article and wherein said first reactant is migrated into said article at said first surface and said second reactant is migrated into said article at said second surface.

5. A method according to claim 4 wherein said first reactant is selected from the group consisting of silane, chlorosilane and fluorosilane.

6. A method according to claim 4 wherein said second reactant comprises a gas selected from the group consisting of oxygen and water vapor.

7. A method according to claim 4 wherein said plastic material is selected from the group consisting of gas permeable plastics comprising silicone rubber, polycarbonate, polypropylene, polystyrene, acrylic, polyethylene, polyesters, and cellulose acetate.

8. A method according to claim 4 wherein said plastic material is polycarbonate, said first reactant is silane and the second reactant is oxygen.

9. A method according to claim 1 wherein said plastic material is treated with a non-reactive swelling agent prior to treatment with said first or second reactants to thereby increase the rate of migration of said first or second reactants into said plastic material.

10. A method according to claim 4 wherein said plastic material is treated with a non-reactive swelling agent prior to treatment with said first or second reactants to form a swollen plastic material wherein the rate of migration of said first or second reactants into said plastic material is increased.

11. A method according to claim 1 wherein said first reactant is migrated into said material and then said second reactant is subsequently migrated into said plastic material.

12. A method according to claim 11 wherein said plastic material is treated with a non-reactive swelling agent prior to migration of said first or second reactants into said plastic structure to form a swollen plastic material wherein the rate of migration of said first or second reactants into said plastic material is increased.

13. A method according to claim 11 wherein said plastic material is treated with a swelling agent comprising said first reactant.

14. A method according to claim 11 wherein said plastic material is selected from the group consisting of gas permeable plastics comprising silicone rubber, polycarbonate, polypropylene, polystyrene, acrylic, polyethylene, polyesters, and cellulose acetate.

* * * * *